US012260441B1

(12) United States Patent
Ashby

(10) Patent No.: US 12,260,441 B1
(45) Date of Patent: *Mar. 25, 2025

(54) VISUAL CABLE BUILDER

(71) Applicant: Fazahl Ashby, Miami, FL (US)

(72) Inventor: Fazahl Ashby, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,618

(22) Filed: Mar. 7, 2023

Related U.S. Application Data

(63) Continuation of application No. 16/352,517, filed on Mar. 13, 2019, now Pat. No. 11,599,925, which is a continuation of application No. 14/943,267, filed on Nov. 17, 2015, now abandoned.

(51) Int. Cl.
*G06Q 30/0601* (2023.01)
*G06Q 10/087* (2023.01)

(52) U.S. Cl.
CPC ....... *G06Q 30/0621* (2013.01); *G06Q 10/087* (2013.01); *G06Q 30/0643* (2013.01)

(58) Field of Classification Search
CPC ............. G06Q 30/0621; G06Q 10/087; G06Q 30/0643
USPC ....................................................... 705/26.5
See application file for complete search history.

(56) References Cited

U.S. PATENT DOCUMENTS

| 6,032,130 A | 2/2000 | Alloul et al. |
| 6,209,029 B1 | 3/2001 | Epstein et al. |
| 6,535,880 B1 | 3/2003 | Musgrove et al. |
| 6,578,011 B1 | 6/2003 | Forward |
| 6,587,835 B1 | 7/2003 | Treyz et al. |
| 6,611,814 B1 | 8/2003 | Lee et al. |
| 6,675,153 B1 | 1/2004 | Cook et al. |
| 6,714,933 B2 | 3/2004 | Musgrove et al. |
| 6,725,222 B1 | 4/2004 | Musgrove et al. |
| 6,907,401 B1 | 6/2005 | Vittal et al. |
| 6,965,868 B1 | 11/2005 | Bednarek |

(Continued)

FOREIGN PATENT DOCUMENTS

WO    WO2009082645    7/2009

OTHER PUBLICATIONS

"Quick Reference Guide Fiber & Copper Interconnect Products", 2015, Custom Cable (Year: 2015).*

(Continued)

*Primary Examiner* — Marissa Thein
*Assistant Examiner* — Thomas Joseph Sullivan
(74) *Attorney, Agent, or Firm* — Malloy & Malloy, P.L.; Jennie S. Malloy; Victor Bruzos

(57) ABSTRACT

The present invention is directed to a visual cable builder, and accompanying systems, methods, and computer programs. Specifically, a plurality of selectable characteristics of a cable component are displayed to a user. A user selection is received of various selectable characteristic(s) of a cable component. Respective display element(s) associated with the user selection of the selectable characteristic(s) are retrieved. The display element(s) are displayed to the user as part of a configured communications cable. In some embodiments, a part number May also be displayed, the part number being generated based on the selected characteristic(s) of the configured communications cable. An alias part number may also be inputted by the user, which may then be associated with the configured communications cable.

13 Claims, 10 Drawing Sheets

(56) References Cited

U.S. PATENT DOCUMENTS

| | | |
|---|---|---|
| 6,990,664 B2 | 1/2006 | Cheeniyil et al. |
| 7,082,426 B2 | 7/2006 | Musgrove et al. |
| 7,085,736 B2 | 8/2006 | Keezer et al. |
| 7,171,382 B2 | 1/2007 | Beacham |
| 7,240,826 B2 | 7/2007 | Abecassis et al. |
| 7,246,084 B1 | 7/2007 | Javangula et al. |
| 7,266,518 B2 | 9/2007 | Klim et al. |
| 7,272,571 B2 | 9/2007 | Tuttrup et al. |
| 7,284,232 B1 | 10/2007 | Bates et al. |
| 7,299,202 B2 | 11/2007 | Swanson |
| 7,305,355 B2 | 12/2007 | Tarvydas et al. |
| 7,315,834 B2 | 1/2008 | Martineau et al. |
| 7,328,176 B2 | 2/2008 | Tarvydas et al. |
| 7,330,833 B1 | 2/2008 | Robb et al. |
| 7,343,323 B1 | 3/2008 | Geddes, Jr. et al. |
| 7,346,555 B2 | 3/2008 | Rippingale et al. |
| 7,373,313 B1 | 5/2008 | Kahle et al. |
| 7,373,314 B2 | 5/2008 | Aliabadi et al. |
| 7,383,254 B2 | 6/2008 | Wen et al. |
| 7,409,362 B2 | 8/2008 | Calabria |
| 7,412,409 B2 | 8/2008 | Aliabadi et al. |
| 7,499,872 B1 | 3/2009 | Thompson |
| 7,526,441 B2 | 4/2009 | Nakajima et al. |
| 7,568,155 B1 | 7/2009 | Axe et al. |
| 7,650,296 B1 | 1/2010 | Brunner et al. |
| 7,680,704 B2 | 3/2010 | Ouchi |
| 7,690,848 B2 | 4/2010 | Faika et al. |
| 7,716,025 B2 | 5/2010 | Bahel et al. |
| 7,725,364 B2 | 5/2010 | Tanaka et al. |
| 7,890,390 B2 | 2/2011 | Cochran et al. |
| 8,566,714 B1 | 10/2013 | Stringer et al. |
| 9,021,527 B1 | 4/2015 | Xue et al. |
| 10,497,047 B2 * | 12/2019 | Stocker ............ G06Q 30/0603 |
| 11,599,925 B1 | 3/2023 | Ashby |
| 2002/0013758 A1 | 1/2002 | Khaitan |
| 2002/0029150 A1 | 3/2002 | Vitale et al. |
| 2002/0072984 A1 | 6/2002 | Rothman |
| 2003/0050862 A1 | 3/2003 | Bleicken |
| 2003/0055753 A1 | 3/2003 | Dellar |
| 2003/0167234 A1 | 9/2003 | Bodmer |
| 2003/0163399 A1 | 10/2003 | Harper et al. |
| 2004/0019536 A1 | 1/2004 | Ashkenazi et al. |
| 2004/0139001 A1 | 7/2004 | Henriques |
| 2005/0102199 A1 * | 5/2005 | Lee ........................ G06Q 30/06 |
| | | 705/26.5 |
| 2005/0177453 A1 | 8/2005 | Anton et al. |
| 2006/0167577 A1 * | 7/2006 | Clark ........................ G06F 8/71 |
| | | 700/97 |
| 2007/0106565 A1 | 5/2007 | Coelho |
| 2007/0180461 A1 | 6/2007 | Hilton |
| 2008/0004981 A1 | 1/2008 | Gopalpur |
| 2008/0249879 A1 | 10/2008 | Walker et al. |
| 2008/0263454 A1 | 10/2008 | Chan et al. |
| 2009/0114418 A1 | 5/2009 | Smith et al. |
| 2010/0066731 A1 | 3/2010 | Vecore et al. |
| 2011/0197124 A1 * | 8/2011 | Garaventa ............ G06F 16/972 |
| | | 715/234 |
| 2011/0218010 A1 | 9/2011 | Hoymann et al. |
| 2012/0010739 A1 | 1/2012 | Elisma |
| 2012/0331422 A1 | 12/2012 | High |
| 2013/0089995 A1 | 4/2013 | Gniadek et al. |
| 2013/0311255 A1 | 11/2013 | Cummins et al. |
| 2014/0222786 A1 * | 8/2014 | Job ..................... G06F 16/9535 |
| | | 707/722 |
| 2015/0324897 A1 | 11/2015 | Venters, III et al. |
| 2016/0048896 A1 * | 2/2016 | Lind .................. G06Q 30/0621 |
| | | 705/26.5 |
| 2016/0260527 A1 | 9/2016 | Otto |
| 2016/0333630 A1 | 11/2016 | Barton et al. |
| 2018/0114610 A1 | 4/2018 | Uegaki et al. |
| 2018/0268421 A1 | 9/2018 | Stonehouse et al. |

OTHER PUBLICATIONS

"Fiber Optic Catalog," 2013, Custom Cable (Year: 2013).*
"CableEye Applications Guide", 1999, CAMI Research (Year: 1999).*
"The Engineer's Guide to Custom Cable Design", 2020, NorthWire (Year: 2020).*
"Custom Cables—The Ultimate Guide To How To Meet Your Needs", 2007, Cloom (Year: 2007).*
Cami Research, CableEye Applications Guide, Jan. 1, 1999.
Custom Cable, Custom Cable, Mar. 27, 2015, buy.customcable.comindex.cfm, Mar. 27, 2015.
Cloom, Custom Cables—The Ultimate Guide to How to Meet Your Needs, Jan. 1, 2007.
Discount Fiber, Discount Fiber Optic Cable discountfiber.com, Aug. 12, 2015.
Custom Cable, Fiber Optic Catalog, Jan. 1, 2013.
Northwire, The Engineer's Guide to Custom Cable Design, Jan. 1, 2020.
Pan Pacific Enterprise Co., Voice Data CommunicationComponents & Accessories, (copyright 2016), cablesandconnectors.com, particularly pp. 7-9, May 16, 2008.
Custom Cable, Quick Reference Guide Fiber & Copper Interconnect Products, Jan. 1, 2015.

* cited by examiner

231

☑ View Stock          Close

Item Details

| | |
|---|---|
| Origin: | USA |
| Option 1: | TP1 |
| Option 2: | CJA |
| Option 3: | C01 |
| Shipper: | California |
| | |
| Details: | Min Order $100 |
| Lead Time: | 5-10 Days |
| Option 4: | No |
| Warranty: | 2 Years |

| Item No | Item Description | Price % | Qty | Field1 | Field2 | Field3 | Field4 | Price | Quantity |
|---|---|---|---|---|---|---|---|---|---|
| CBL-C5E101BLSH07F | Blue Cable With Custom Options TP1 C01 CJA - 07 Feet | | | | | Yes | | $19.99 | 2 |

| Item No | Item Description | Price % | Qty | Field1 | Field2 | Field3 | Field4 | Price | Extended | Profit | Profit % | Notes |
|---|---|---|---|---|---|---|---|---|---|---|---|---|
| CBL-C5E101BLSH07F | Blue Cable With Custom Options TP1 C01 CJA - 07 Feet | P-50 | 16 | 5.00 | 4.50 | Yes | Yes | 10.00 | 160.00 | 80.00 | 50% | In-Stock |

| | Value 1 | Value 2 | Value 3 | Value 4 |
|---|---|---|---|---|
| TOTALS | $160.00 | $80.00 | $80.00 | 50 % |
| | Action 1 | Action 2 | Action 3 | Action 4 | Action 5 |

VISUAL CABLE BUILDER

CLAIM OF PRIORITY

The present application is a Continuation application of a previously filed application having Ser. No. 16/352,517, filed on Mar. 13, 2019, which is set to mature into U.S. Pat. No. 11,599,925 on Mar. 7, 2023, which application was a Continuation of a previously filed application having Ser. No. 14/943,267, filed on Nov. 17, 2015, which are both incorporated herein by reference in their entireties.

BACKGROUND OF THE INVENTION

Field of the Invention

The present invention generally relates to a visual cable builder, and related systems, methods, and computer programs for building and visualizing a custom communications cable in electronic commerce transactions, as well as the ability to attribute a custom or alias part number to a particular configuration.

Description of the Related Art

Networking cables generally include a plurality of custom and configurable wires, wire insulation, connectors, and cable jackets. Networking cables may comprise various types and/or materials of cabling such as coaxial, optical, twisted pairs (shielded, foiled, unshielded), and other types of communication cables. Depending on the network topology, protocol, size, as well as budgetary and other constraints, different cables of various configurations may be desirable in different project situations. Therefore, in information technology deployment and management, a high degree of customization is desirable for each particular customer and/or reseller of networking cables.

The customization of cables for quote or purchase, via electronic commerce websites, is not new. Rather, numerous consumers, information technology companies, and resellers purchase configurable cables from available online vendors today. However, due to the increasing complexity of available options, mistakes and confusion are commonly caused by current electronic commerce websites and their rudimentary user interfaces and selectable options. For example, configuring an optical cable alone requires the detailed selection of at least the fiber core (single mode or multimode), the strands (simplex or duplex), the combinations of plurality of connectors (LC, SC, ST, MT-RT, FC), and the length, and as such it is a common occurrence for a purchaser or reseller to confuse various strand types or connector types.

Thus, the present invention proposes a visual cable builder for providing a live visualization of a user's configuration of a communications cable, providing ready feedback during each step of the cable configuration. Accordingly, the present invention is able to validate a user's selection visually and immediately upon a user selection of one or more cable characteristics, thereby minimizing mistakes in the cable order selection.

Moreover, it would also be advantageous for consumers to save previously configured cable configurations, such that they may be readily accessed again in the future for reordering. Therefore, another objective of the present invention is to provide for the ability to generate part numbers based on the selected characteristic(s) of a configured communications cable, and associate the generated parts number with various elements or selected characteristic(s) of various cable components. This would also be advantageous as it allows manufacturers or resellers to quickly pinpoint the type of cable that is being purchased or quoted.

Further, and particularly in the communications cables resale environment, it would additionally be advantageous to provide for the ability to associate an alias parts number with a generated part number or with the configured communications cable itself. The alias part number allows a reseller user to customize a second part number for identifying a communications cable product, thereby encouraging consistence of sales channels and/or brand loyalty for customers who may seek purchases by searching out the reseller's unique alias part number.

SUMMARY OF THE INVENTION

The present invention is generally directed to a visual cable builder, and accompanying systems, methods, and computer programs thereof which provides the advantages described above. Particularly, the present invention may comprise methods and computer software for the interactive visualization of a user's selection of various networking cable components.

Specifically, the present invention may be implemented as a software as a service via an application server in an electronic commerce embodiment, or as an installable software on a personal computer. Systems for implementing the present invention may therefore comprise general purpose computers, specialized computers such as an application server, client devices, and/or a network.

A method and/or computer program of the present invention may involve displaying a user interface for configuring a communications cable to a user, the user interface having a plurality of selectable characteristics of one or more cable components. Next, a user selection of one or more selectable characteristic(s) is received at the computer or application server. A display element associated with the selected characteristic is retrieved. The display element is displayed to the user as part of a configured communications cable. In a preferred embodiment, the display element is retrieved and displayed to the user in real time, immediately, and/or within a few seconds of the user's selection of one or more selectable characteristic(s).

In one embodiment, a part number for the configured communications cable is also displayed with the present configuration and/or selection of the communications cable (the configured communications cable), the part number being generated based on one or more of the selected characteristics of the configured communications cable.

In one embodiment, an alias part number may be received at the computer or application server. This alias part number may be further associated with the configured communications cable, in addition to the part number that was generated.

In one embodiment, a request may be received at the computer or application server to perform an inventory check of the configured communications cable. The inventory check May be conducted on the application server and/or on any third-party server(s) in communication with the application server, such as one belonging to a partner manufacturer. The inventory data is then displayed to the user.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 2B is an exemplary user interface in in partial cutaway view illustrating a portion of a visual cable builder for configuring a communications cable.

FIG. 2C is an exemplary user interface in in partial cutaway view illustrating a portion of a visual cable builder for configuring a communications cable.

Figure 3:
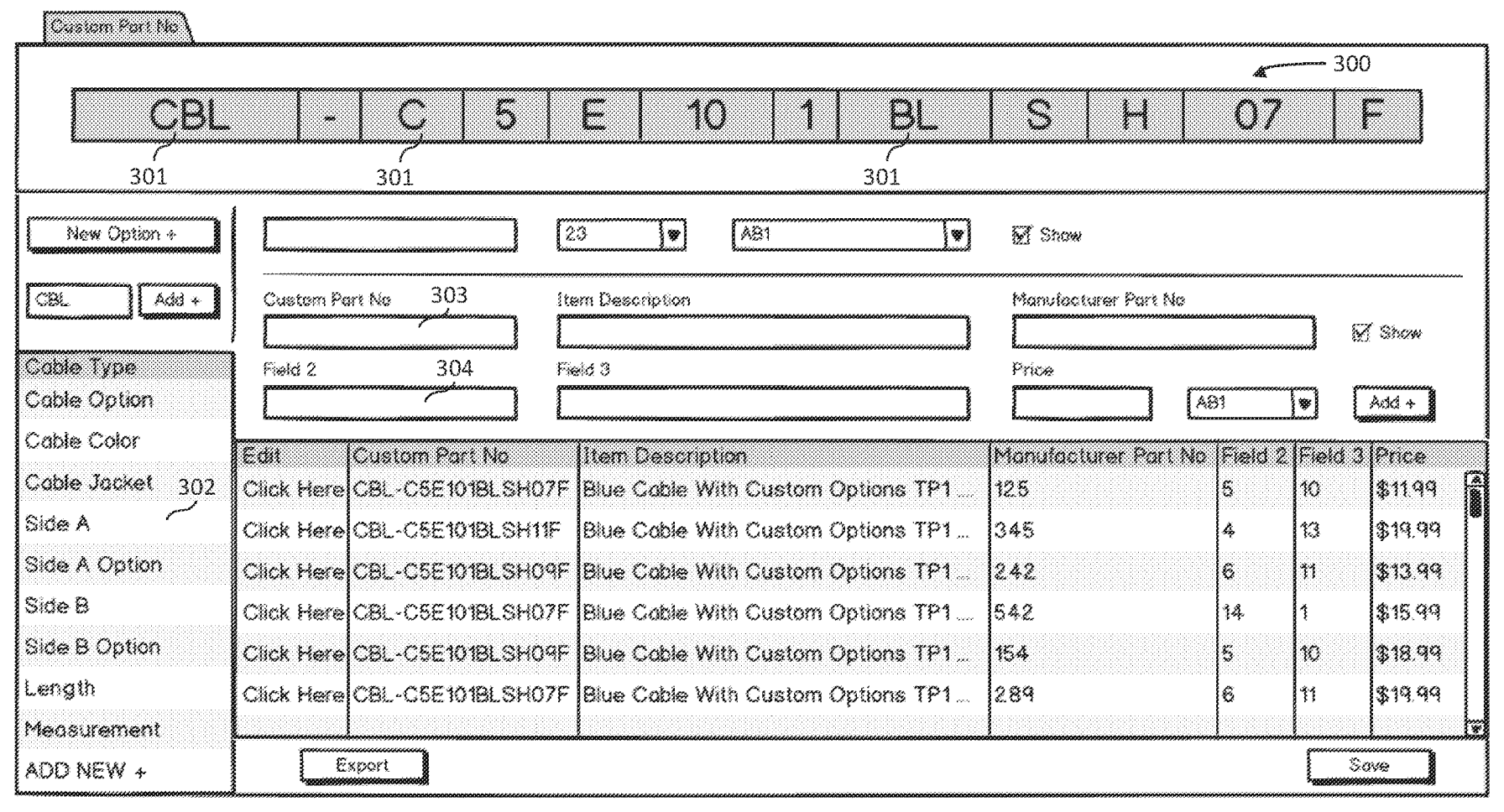

FIG. 3 is an exemplary user interface illustrating a part number builder for customizing part numbers for a configured communications cable.

Like reference numerals refer to like parts throughout the several views of the drawings.

DETAILED DESCRIPTION OF THE PREFERRED EMBODIMENT

As schematically represented in the accompanying drawings, the present invention is generally directed to a visual cable builder, and accompanying systems, methods, and computer programs thereof.

A. Overview of Implementation System(s)

Figure 1:
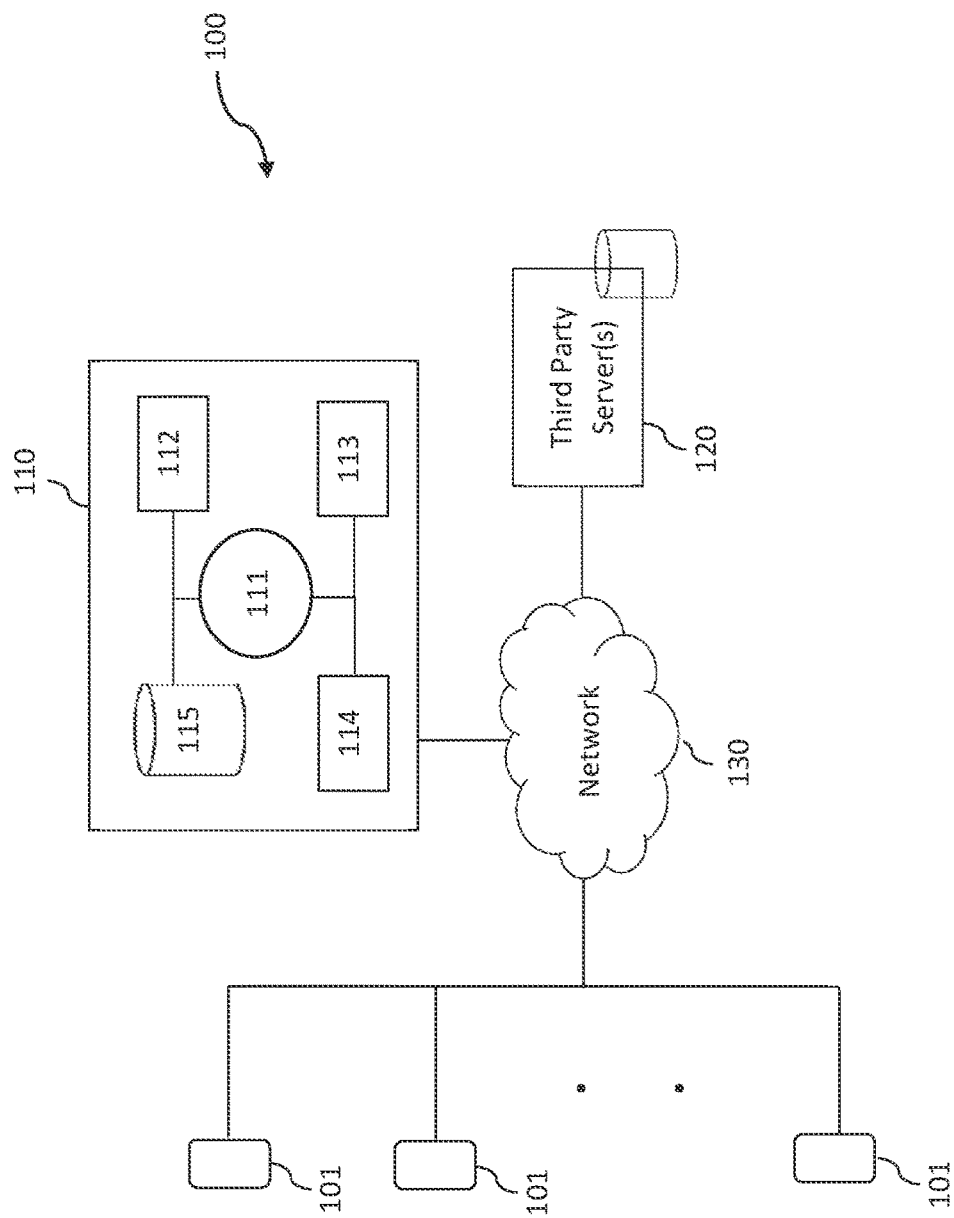
FIG. 1 is a diagrammatic representation of an exemplary system for providing a visual cable builder.

In one embodiment, a visual cable builder of the present invention may be deployed as a software as a service (SaaS) in accordance with implementation on a system 100 as generally represented in FIG. 1. Accordingly, the system 100 of the present invention generally comprises at least one client device or device 101 communicably connected to an application server 110 over a network 130. One or more third party server(s) 120 may further be communicably connected to the application server 110 and the at least one device 101 over the same network 130.

The device 101 may comprise a mobile device, a tablet, a computer, a wearable electronic device, or any other device or combination of circuits structured and configured to communicate with another device, computer, or server over the network 130. The device 101 may comprise application(s) and user interface(s) (front-end interface) that allows a user to interact with the application server 110 and any third-party server(s) 120 and stored applications and programs thereon (back-end processing). The user interface may be proprietary and may comprise a custom developed mobile or desktop application(s). Alternatively, or in addition to, the user interface May comprise a web browser, mobile browser, or other application or executable code that allows for communication and visualization of information.

The term "application server" 110, "third party server" 120 refer to at least one computer having appropriate hardware and applications installed thereon for the provision of server services including web and other functional services described herein, such that a user may access, execute, and/or view the applications remotely from a device 101. More specifically, the application server 110 and third-party server(s) 120 may comprise general purpose computers, specialized computers, or other hardware components structured and configured to receive, process, transmit, and store information to and from other devices. The application server 110 is further configured with executable or interpretable computer code that allows it to perform the processes described within this application.

For example, the application server 110 may comprise a general purpose computer comprising a central processing unit (CPU) 111, which may be a single core or multi core processor, memory 114 (random-access memory, read-only memory, and/or flash memory) or primary memory for high-speed storage of executing programs, electronic storage unit 115 (e.g., hard disk) or secondary memory for storing data, communications interface 112 (e.g., network adapter) for communicating with other devices or computers over a network, and/or peripheral device(s) 113 in communication with the CPU 111 that enable input/output of the application server 110.

The application server 110 may implement the methodology of the present invention using any number of solution stacks (a set of software subsystems or components) known to an ordinary computer or web programmer skilled in the art. These solution stacks may include, without limitation, ZEND Server, APACHE Server, NODE.JS, ASP, PHP, Ruby, XAMPP, LAMP, WAMP, MAMP, WISA, LEAP, GLASS, LYME, LYCE, OpenStack, Ganeti, MEAN, MEEN, XRX, and other past, present, or future equivalent solution stacks, or combinations thereof, known to those skilled in the art that allows a programmer to develop the methods and computer programs described within this application. The software stack might be implemented without third-party cloud platforms, for example using load balancing and virtualization software provided by Citrix, Microsoft, VMware, Map-Reduce, Google Filesystem, Xen, memory caching software such as Memcached and Membase, structured storage software such as MySQL, MariaDB, XtraDB, etc. and/or other appropriate platforms. Of course, these solution stacks may also be deployed in cloud platforms by using known development tools and server hosting services such as GitHub and Rackspace, as well as their equivalents.

The third-party server(s) 120 may comprise any combination of hardware and software (code segments in any number of programmable, executable, or interpretable languages that support the functionality of the methods described herein) configured to host and transmit calendar items of a user. The third-party server(s) 120 may be configured to communicate directly to the application server 110 via application programming interfaces or upon the request of a user.

The network 130 may comprise at least two computers in communication with each other, which may form a data network such as via LAN, WAN, Serial, Z-WAVE, ZIGBEE, RS-485, MODBUS, BACNET, the Internet, or combinations thereof. The connections may be facilitated over various wired and/or wireless mediums or any combination thereof including interconnections by routers and/or gateways. Network 130 may comprise additional hardware components and/or devices appropriate for facilitating the transmission and communication between the various systems and devices of the present invention, such as those directed to integrated authentication, quality control or to improve content delivery such as via a content delivery network (CDN).

Of course, in one embodiment, a visual cable builder may also be deployed on one or more computers as an installable software. Therefore, one or more elements of the system 100 may be omitted. That is, the present invention may be implemented on, and therefore require only, a single computer such as that exemplified by application server 110, without reliance upon network services.

Various aspects of the present invention may be thought of as "products" or "articles of manufacture" typically in the form of machine (or processor) executable code, interpretable code, and/or associated data that is carried on or embodied in a machine readable medium. Machine-executable code can be stored on an electronic storage unit, such memory (e.g., read-only memory, random-access memory, flash memory) or a hard disk, as described above.

All or portions of the software may at times be communicated through the Internet or other communication networks. Such communications, for example, may enable loading of the software from one computer or processor onto another, for example, from a management server or host computer onto the computer platform of an application server, or from an application server onto a client computer or device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, tangible "storage" media, terms such as computer or machine "readable medium", refer to any medium that participates in providing instructions to a processor for execution. Further, the term "non-transitory" computer readable media includes both volatile and non-volatile media, including RAM. In other words, non-transitory computer media excludes only transitory propagating signals per se, but includes at least register memory, processor cache, RAM, and equivalents thereof.

Therefore, a machine readable medium, such as computer-executable code, may take many forms, including but not limited to, a tangible storage medium, a carrier wave medium or physical transmission medium. Non-volatile storage media include, for example, optical, magnetic, or solid state disks, such as any of the storage devices in any computer(s) or the like, such as may be used to house the databases. Volatile storage media include dynamic memory, such as main memory of such a computer platform. Tangible transmission media may include coaxial cables, copper wire and fiber optics, communication buses. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

B. Overview of the Visual Cable Builder

Drawing attention to FIGS. 2-5, exemplary user interfaces are provided, illustrating the functionality of the methods and computer programs of the present invention.

Specifically, drawing attention to FIG. 2, a partial cutaway view of a graphical user interface initially details various functionalities of the visual cable builder. Specifically, a configured communications cable is visualized as part of a cable display code segment 200, the configured communications cable 200 comprising a plurality of cable components, namely at least a first connector 201, a second connector 203, and a cable 202.

Each cable component 201-203 comprises a plurality of selectable characteristics. The selectable characteristics may be formed by a user input code segment 220.

The selectable characteristics of the first cable connector 201 may comprise a first connector type, a first connector polish. The selectable characteristics of the second cable connector 203 may similarly comprise a second connector type, a second connector polish. The first and second connector types may comprise LC, SC, ST, MT-RJ, FC, LC Crossover, LC Unabridged, SC Crossover, SC Unabridged, MT-RJ Male, Pigtail, as well as other appropriate connector types known in the art. The first and second connector polishes may comprise PC, UPC, APC, as well as other appropriate polish types known in the art.

The selectable characteristics of the cable 202 may comprise a cable type (in the case of fiber optic cables, a fiber core), the strand type, the length, the jacket color, the jacket type, the jacket diameter. In a fiber embodiment, the fiber core may comprise Multimode 62.5/125 (OM1), Multimode 50/125 (OM2), Multimode 10 Gb 50/125 (OM3), Multimode 10 Gb 50/125 (OM4), Single Mode 9/125 (OS1/OS2), Bend-Insensitive G.657.A.1 (10 mm) 9/125, and other types of fiber core known in the art. The strand type may comprise duplex or simplex. The length may be custom inputted by a user, and/or may range between 1 to 100000 meters, inches, feet, or cm. The jacket color may comprise any color spectrum. The jacket type may comprise PVC (OFNR), LSZH (Low Smoke Zero Halogen), Plenum (OFNP), and other appropriate jacket types known in the art. The jacket diameter may comprise 0.9 mm, 1.6 mm, 2 mm, 3 mm, a diameter selected between the range of 0.5 mm-5 mm, and other appropriate diameters known in the art.

Figure 2A:
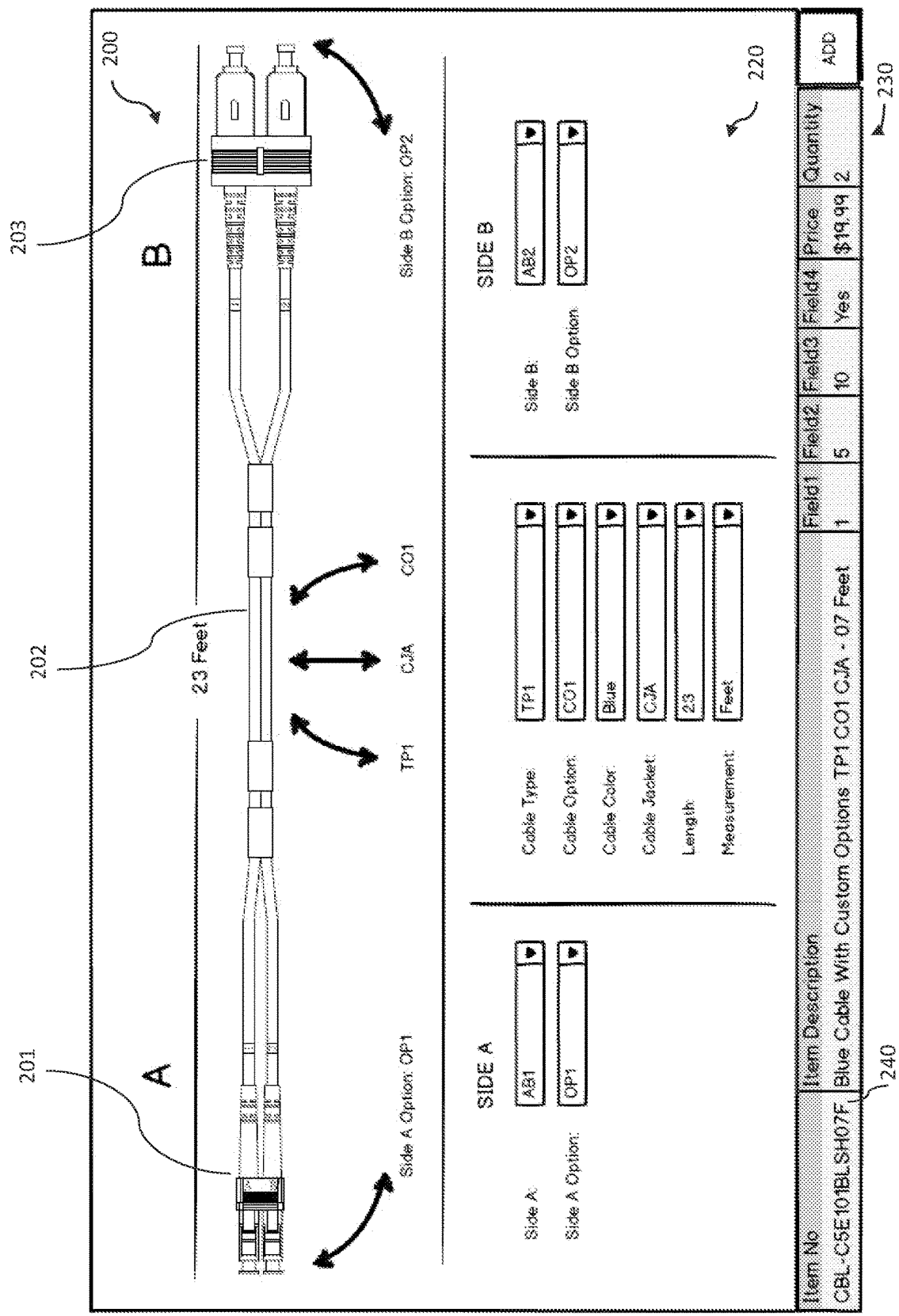
FIG. 2A is an exemplary user interface in partial cutaway view illustrating a portion of a visual cable builder for configuring a communications cable.
Figure 4:
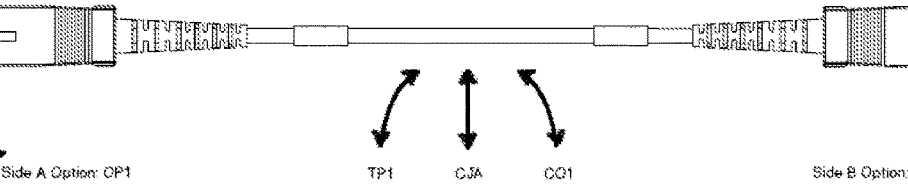
FIG. 4 is an exemplary user interface illustrating a visual cable builder for configuring a communications cable.
Figure 5:
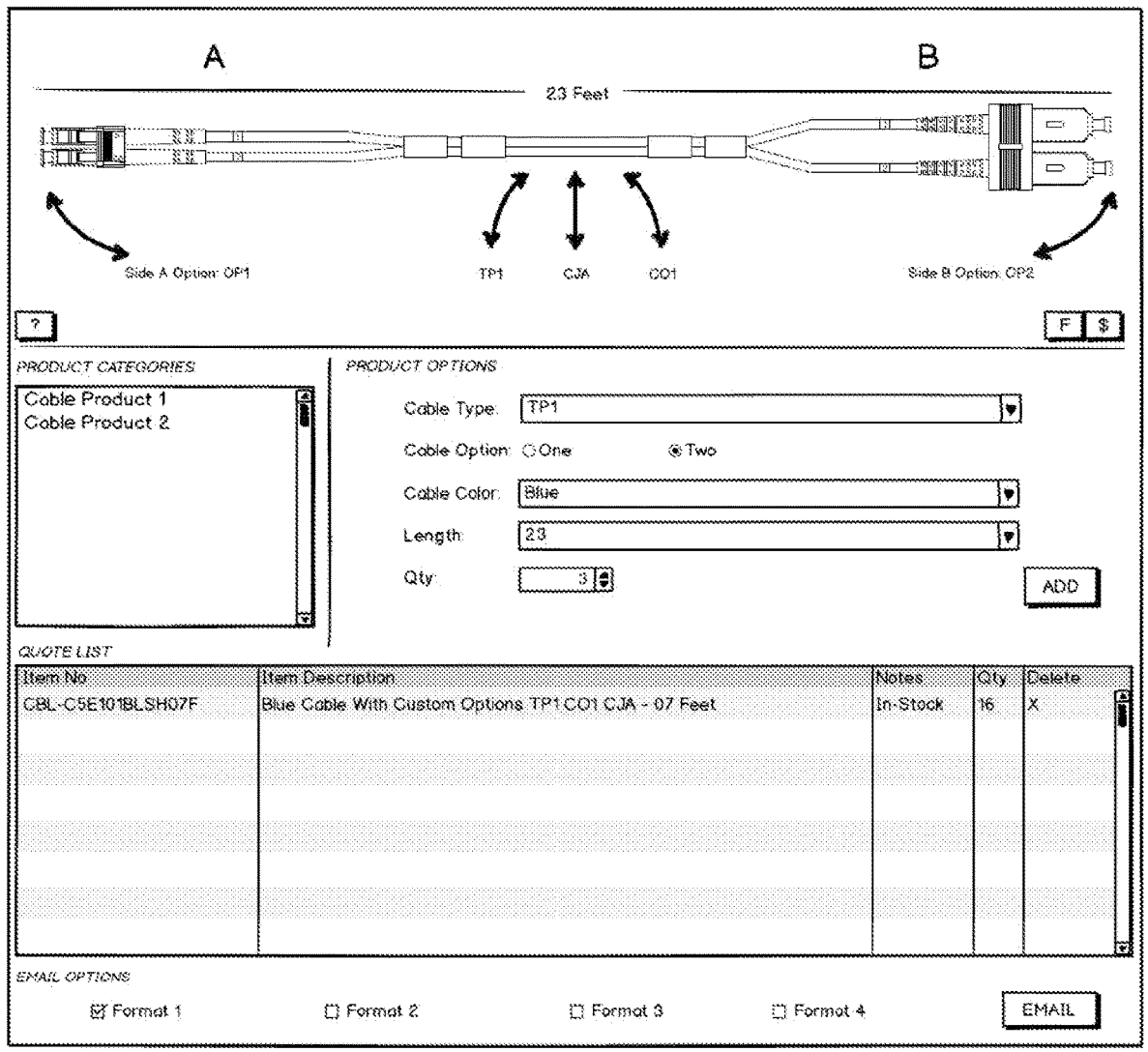
FIG. 5 is an exemplary user interface illustrating a visual cable builder for configuring a communications cable.

In one embodiment, when a user selects at least one of the selectable characteristics, such as from the dropdown menus shown in FIG. 2A, the configurable communications cable shown at 200 updates immediately or in real time. In other words, a respective display element associated with a user selection of a selectable characteristic of a cable component is retrieved and displayed at 201, 202, and/or 203, depending on the user selection made, immediately after a user selection is made. By providing a live and immediate visual representation during the user customization of a cable, chances of error are minimized. Drawing attention to the transition between FIG. 4 to FIG. 5, this immediate visualization is shown, i.e. when the "Simplex" strand is selected in FIG. 4, a single wire is immediately shown; whereas when the "Duplex" strand is selected in FIG. 5, two wires are immediately shown. The same follows to the selection of the connector types, i.e. from SC to SC in FIG. 4, to LC to SC in FIG. 5.

In one embodiment, this live visualization may be created using a jQuery script in combination with cascading style sheets (CSS) for fetching visual elements associated with user input fields. In other words, each selectable characteristic of a cable component may be tied to a particular image (JPG, PNG, GIF, TIFF, BMP, and other appropriate images for web or mobile application display) previously created and stored on the application server. Upon a user selection of a particular selectable characteristic, the associated image is fetched and displayed as part of the configured communications cable. The custom CSS configuration ensures that the image of each component lines up with the other components, such that a seamless communications cable is visualized. For example, in a HTML embodiment, the <div> container for configuring the layout of the communications cable may be as follows:

```
<div class="image_previews_container">
<img style="float: left; width: 317px; height: 123px;" src="images/confImages/L-LC-D-P-AQUA2.JPG" id="LeftPanel"/>
<img style="float: left; width: 64px; height: 123px;" src="images/confImages/M-D-AQUA-2.JPG" id="CentralPanel"/>
<img style="float: left; width: 317px; height: 123px;" src="images/confImages/R-LC-D-P-AQUA2.JPG" id="RightPanel"/>
<table align="left" width="426" class="preview_captions_table"><tbody><tr><td class="paImage"><span style="float: left;">Polish: </span>
<span id="paImage" style="float: left;">PC</span>
</td><td style="min-width: 68px;" id="jtypeImage">PVC (OFNR)</td><td style="min-width: 70px;" id="jdiamImage">2 mm</td><td id="fsImage" class="fsImage">G5 Duplex</td><td width="260" class="pbImagePolish"><span style="float: left;">Polish: </span>
<span id="pbImage">PC</span></td></tr></tbody></table> </div>
```

The selection of the visual elements may be affected by the user input element 220, which may comprise a series of drop down boxes, selectable menus, text or numerical input boxes, or other input methods and interfaces known to ordinary programmers skilled in the art.

In one embodiment, the visual cable builder of the present invention may form part of a larger electronic commerce framework, such as to provide the functionality to receive a price quote from a manufacturer of the configured communications cable, to send a price quote plus a configurable profit margin to a buyer, as a reseller, of the configured communications cable, and/or to purchase or sell the configured communications cable in the online marketplace as part of a web portal comprising the visual cable builder.

As such, drawing attention to 230 of FIG. 2A, an inventory data section and/or code segment 230 is shown which may be represented under Fields 1-4, which may correspond to stock number, available number, stock pricing, unit pricing, available pricing, etc. As illustrated, a description corresponding to the configured communications cable (having user selected characteristics as described above) may be shown under Item Description, in correlation with how the cable has been configured and/or selected. An inventory checker may be implemented to check predesignated inventories and/or inventories of third parties through respective third-party server(s), i.e. inventory data. For example, and as shown in FIG. 2B, upon selection of a checkbox 231, the present invention may automatically check the inventory of the currently selected cable components and/or configured communication cable, and return with a numerical stock number corresponding to the system(s) queried. In one embodiment, the present invention may recommend the closest match based on one or more selected characteristics. In one embodiment, specifications 232 of the current configured communications cable may also be populated or displayed immediately, similar to the visual elements. Specifications 232 of a cable may comprise place of manufacturer, core, jacket, connector(s), shipping information, warranty information, etc.

A user may add various quantities of the cable to cart or a list, as shown in FIG. 2C, as represented by Actions 1 through 5, and may affect operations such as "Push", "Export", "Send Quote", "Save", or "Check Out". The present invention in one embodiment may incorporate in electronic commerce functions, such as the ability to purchase or request a quote for the customer or user configured cable. As such, it becomes important to associate a unique identifier to the cable, such as to ensure the accuracy of the product being purchased or quoted. In one embodiment, the Values 1 through 4 may represent the selling rate, cost rate, margin rate, and margin percentage so as to show a reseller his or her profit margin. In other embodiments involving electronic resale or drop shipping of the communication cables, the present invention offers an additional unique and advantageous feature, whereby a reseller or drop shipper may set a margin and to send a price quote to a potential customer, using a custom logo, layout, and/or notably an alias or masking serial number as determined by the reseller through an affiliate or reseller account with a system of the present invention.

Accordingly, a part number (item number) section and/or code segment 240 may also be generated in an embodiment of the present invention, in accordance with a rules engine. Drawing attention to FIG. 3, an exemplary and configurable part number 300 is generally shown as part of a user interface, the configurable part number 300 having a plurality of part number segments 301. Each part number segment 301 may correspond with at least one selectable characteristic of a cable component, such as Connector A or Side A (the first connector) 302, Connector B or Side B (the second connector) 303, and various characteristics of the cable itself, such as connector type, polish, cable jacket diameter, type, color, etc. Each part number segment 301 may be selected to be static or variable. A static segment fixedly assigns a segment of alphanumeric or other readable characters to a certain selectable characteristic of a cable component. A variable segment may automatically or partially automatically generate a part segment comprising of alphanumeric or other readable characteristics for a certain part or component characteristic, if such does not already exist in a database in communication with a system of the present invention. Of course, other characteristics may also be assigned to various configurable or selectable characteristics of a communications cable, including but not limited to, a base name, a base description, a display name, an alias name, an alias description, and the cost (per unit of measurement, or per connector). Custom part numbers may be exported as a downloadable file and/or saved to a user account attributed to the user. Hence, in one embodiment, user accounts and authentication may be implemented in order to access and retrieve configured communications cables.

Drawing attention back to FIGS. 2A-2C, and based on the predefined or user customized part numbers rules engine, a part number is generated for the particular configured communications cable. Like the visual display elements and/or specifications of the cable, this part number may also be updated in real time, i.e. upon a user selection or change of a selectable characteristic. In one embodiment, a user may be able to enter or copy paste in a parts number or portions thereof, in order to select one or more selectable characteristics of the cable.

In one embodiment, an alias part number code segment 303 may be provided in order to create a second set or sets of part numbers, which is equivalent to a first set or generated part number. This is particularly advantageous because it allows the manufacturer and supplier side to use a common notation (i.e. the first set) for determining a particular communications cable or components thereof. At the same time, it allows a reseller of communication cables to create a second set of part numbers (an alias part number), which may then be visualized and/or presented to the end consumer via a separate sales portal or website. As such, when a consumer is seeking replacement cables and/or wishes to order additional cables, a consumer may search for the reseller's unique alias part number in a search engine, and thereafter be directed to the reseller's website, rather than a competitor's website. As such, drawing attention to FIG. 3 again, the fields 303 and 304 allows a reseller to stipulate a second set of part number and/or description for a particular communications cable, in addition to a manufacturer part number. One exemplary implementation may be to create a second identifier field for a communications cable and/or component, which in addition to the base part number or name, also adds an alias part number or name. Such an alias part number would be unique to the user creating it in at least one embodiment.

Figure 6:
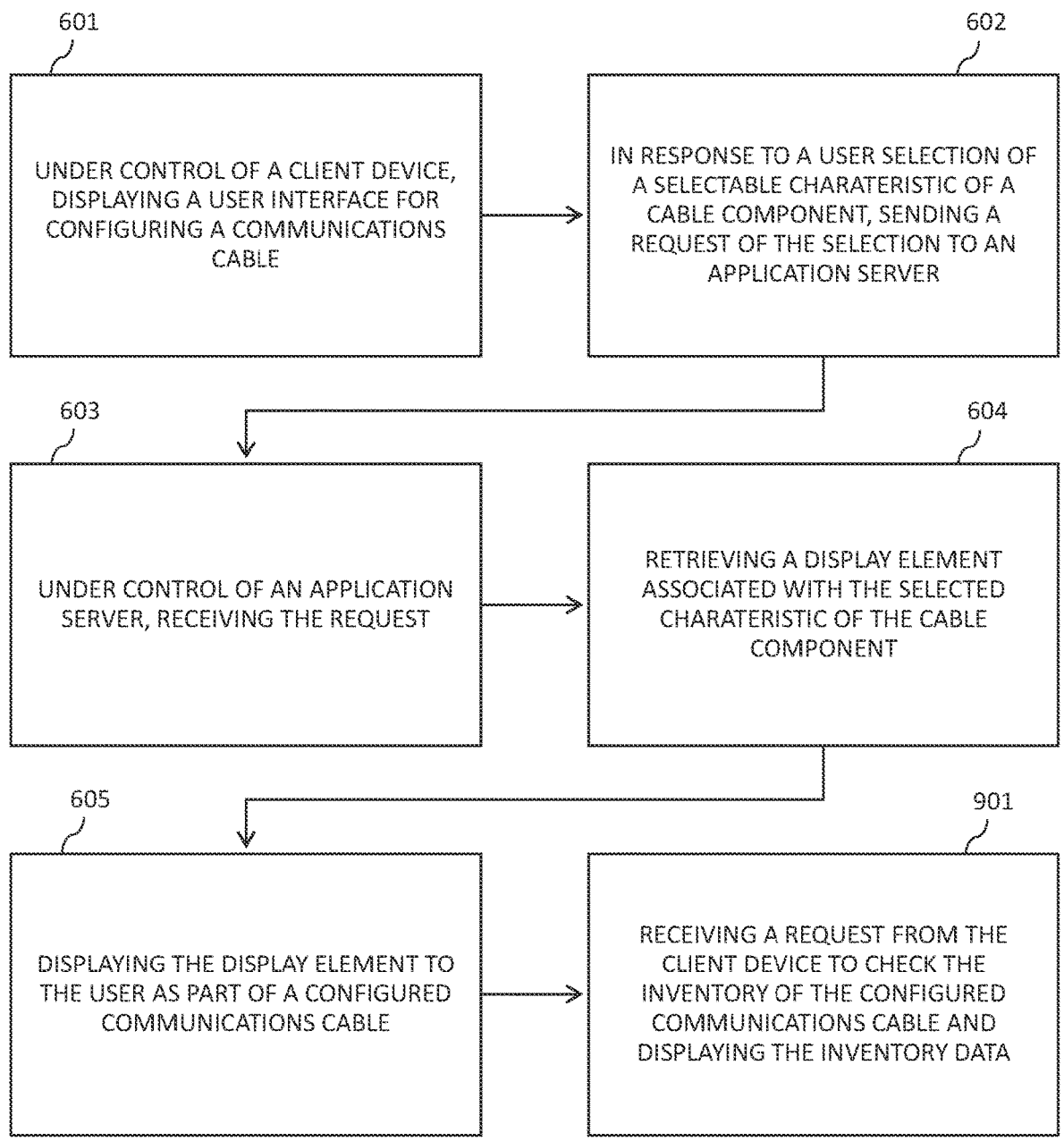
FIG. 6 is a flowchart illustrating a method for providing interactive visualization of a configurable communications cable.

C. Methods for Providing Interactive Visualization of a Configurable Communications Cable A method in accordance with FIG. 6 illustrates the process of providing interactive visualization of a configurable communications cable. As such, initially under control of a client device, a user interface is displayed for configuring a communications cable, as in 601. This user interface may comprise an interface similar to those illustrated in FIGS. 2-5. The user interface may form a single screen presented on the client device, or alternatively, a plurality of screens navigable via a navigation menu. The user interface may be entirely implemented as a web document or application such as in HTML, CSS, Flash, PHP, and other programmable and/or interpretable language, and viewable via a web browser. Alternatively, the user interface May form a mobile application native to iOS, Android, or other mobile platforms known to those skilled in the art.

In response to a user selection of a selectable characteristic of a cable component, a request is sent to an application server, as in 602. The cable component may comprise a first connector, a second connector, and/or a cable. The selectable characteristics of the first connector May comprise a first connector type and/or a first connector polish. The selectable characteristics of the second connector may comprise a second connector type and/or a second connector polish. The selectable characteristics of the cable may comprise a cable core, a fiber core in a fiber embodiment, a strand type, a cable length, a jacket color, a jacket type, and/or a jacket diameter.

Under control of the application server, the application server receives the request, as in 603. The request may be received via a website portal or form, via a mobile application request, or other appropriate communication request mechanisms in an Internet embodiment. A display element associated with the selected characteristic of the cable component is retrieved, as in 604. The display element may comprise image(s) and/or text associated with a user's selection request. In one example, the request may comprise a JavaScript function or other programmed function for retrieving a pre-stored and/or pre-generated display element, such as an image or text.

On the application server, the display element is displayed to the user as part of a configured communications cable, as in 605. This display step may involve the loading the image into a specified display area on a web page and received by a client device over the HTTP protocol via a script such as JavaScript. In one embodiment, the display step may involve transmitting or pushing an image to a client device, the function being coded for an application native to a particular mobile operating system.

In one embodiment, the application server may be configured for data mining, i.e. such as to perform extract, transform, and load (ETL) or spidering operations, which involve the loading of information from a raw data source, i.e. a manufacturer's inventory data, associate a parts number or equate a system generated parts number with the manufacturer's inventory matching the configured communications cable, and thereafter display the numerical inventory data to the user that matches the user's set criteria, i.e. warranty requirements, shipping times, price, etc. In an embodiment, business intelligence platforms such as SAS, SAP, Tableau, Tibco, and other equivalents may be used. As such, the application server may further receive a request from the client device to check the inventory of configured communications cable, as in 901, and display the inventory data.

Figure 7:
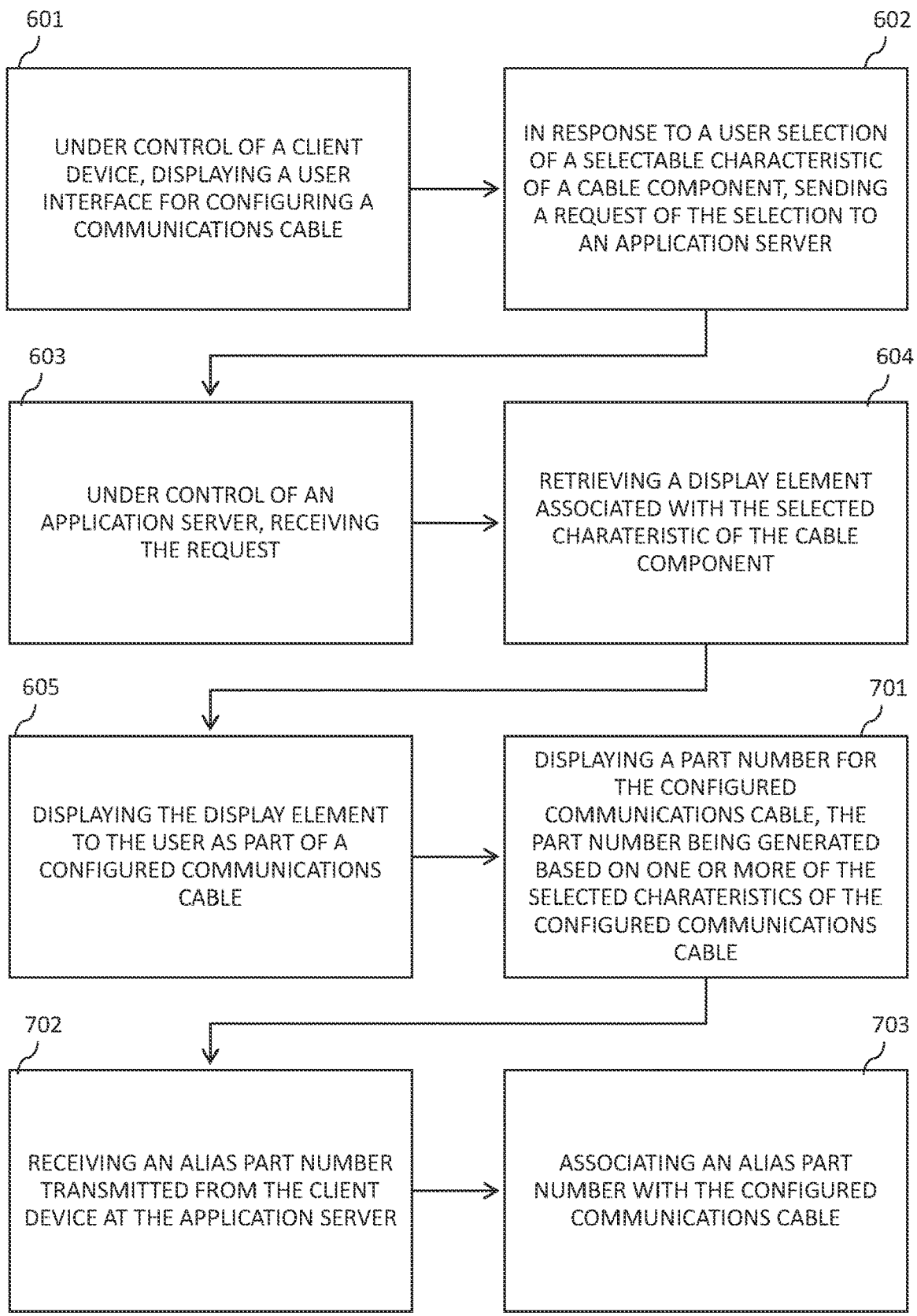
FIG. 7 is a flowchart illustrating a method for providing interactive visualization of a configurable communications cable.

Drawing attention to FIG. 7, additional embodiments of the present invention May comprise displaying a part number for the configured communications cable, the part number being generated based on one or more of the selected characteristics of the configured communications cable, as in 701. Drawing attention back to FIG. 3, a part number 300 may comprise a plurality of part number components 301. Each part number component 301 may correspond to a cable component, and its makeup of alphanumeric or other visible characters May correspond to various selectable characteristics of the cable component, as predefined by the system, manufacturer, or as custom defined by a user. In one embodiment, a parts number will be automatically generated based on a rules engine drawing upon the part number components 301 that are associated with selectable components, and displayed as a visual element or as part of the configured communications cable of the present invention.

Optionally, an alias part number transmitted from the client device is received at the application server, as in 702. The alias part number is associated with the configured communications cable, as in 703. In other words, in an embodiment, a database entry corresponding to a configured communications cable may comprise or be linked to at least two data fields, one being the system default parts number, i.e. a number utilized by the system and the manufacturer or warehouse drop shipper to identify a custom communications cable; the other being an alias number associated with a particular user, i.e. the creating user, such that the alias number or part number may be utilized by the user and the user's purchasers to identify the custom communications cable.

Figure 8:
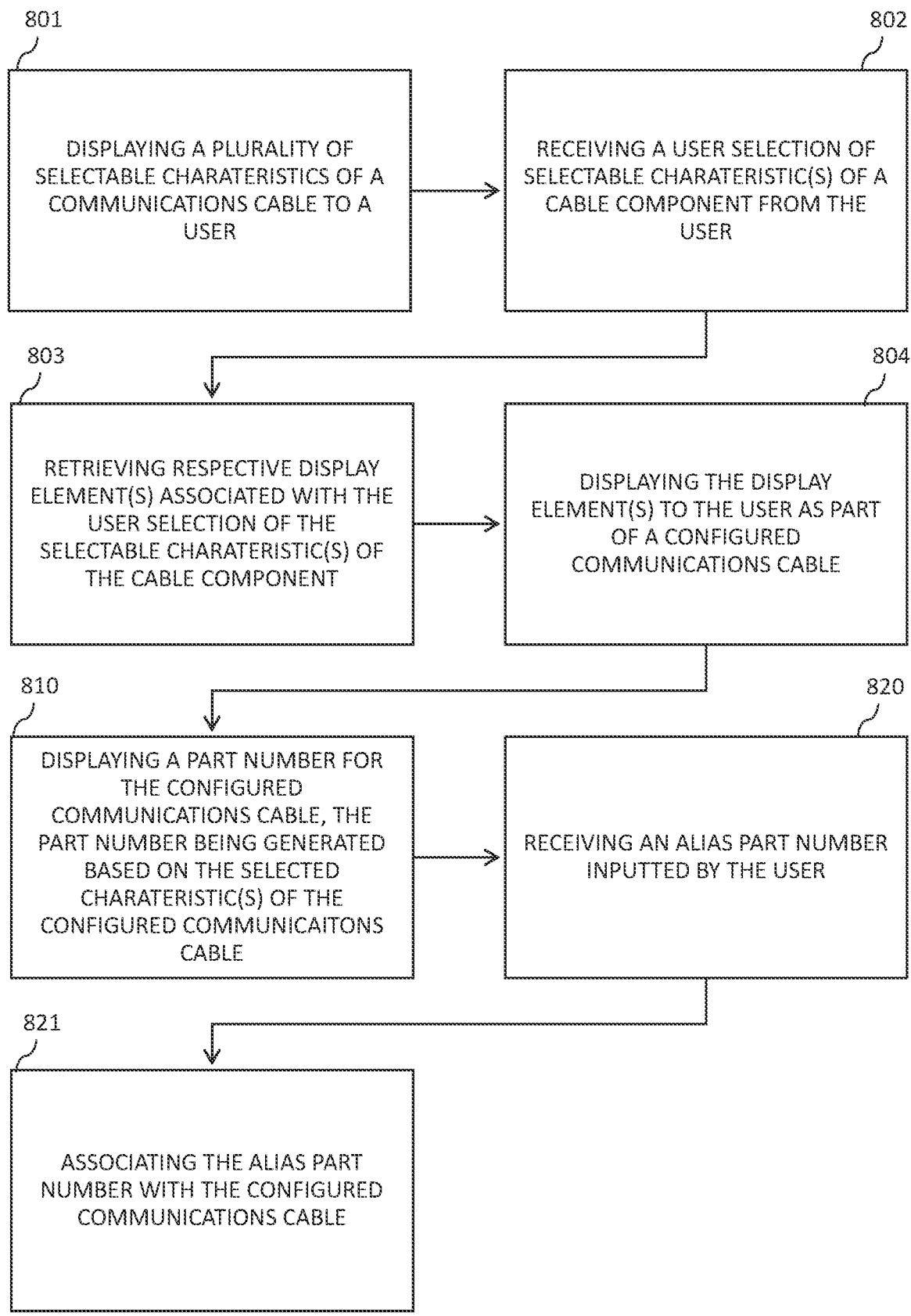
FIG. 8 is a flowchart illustrating a method for providing interactive visualization of a configurable communications cable.

Drawing attention to FIG. 8, a method of the present invention may also be implemented on a single computer, or on a combination of machines without resort to utilization of a network. As such, in this embodiment, a plurality of selectable characteristics of a cable component are first displayed to a user, as in 801. A user selection is received of the selectable characteristics of the cable component, as in 802. The respective display element(s) associated with the user selection of the selectable characteristic(s) of the cable component is then retrieved, as in 803. The display element(s) are displayed to the user as part of a configured communications cable, as in 804.

In one embodiment, a part number may be displayed for the configured communications cable, as in 810, the part number being generated based on the selected characteristic(s) of the configured communications cable.

In one embodiment, an alias part number may be inputted by the user, as in 820. The alias part number may then be associated with the configured communications cable, as in 821. The functionalities of the embodiment FIG. 8 may share characteristics as the application server embodiment described above.

Individual components or elements of the system and method may be used interchangeably. The order of the method or processes described above may be arranged in any combination in various embodiments. In some embodiments, various steps may be omitted.

It should also be understood that the above methods may exist as other embodiments when not in operation. Specifically, a computer program may exist on a non-transitory storage medium such as a hard disk, flash drive, nonvolatile memory, or other storage device, which captures the operational processes and characteristics described above, and which may be executed by a computer or other device to perform the method described above. The computer program may be written in any programmable or interpretable language known to a person reasonably skilled in the art, including but not limited to C, C++, C#, Ruby, Java, Dart, Rust, Swift, PHP, Perl, HTML, XHTML, and other equivalent languages and past, present and future variations.

Further, a physical system may also be designed by employing existing components and hardware known to those of ordinary skill in the art, such as to affect the operation of the method described above in a general purpose computer, a specialized computer or machine, as a software on chip, or as part of other integrated circuits or combination of circuitry and components.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A computer program on a non-transitory computer readable medium, for execution by a computer for providing interactive visualization of a configurable communications cable, the computer program comprising:
a user input code segment configured to:
display a plurality of selectable characteristics of a cable component to a user,
receive a user selection of at least one of said plurality of selectable characteristics of said cable component from said user,
a parts number code segment configured to:
display a configurable part number for said configured communications cable, said configurable part number being generated based on an aggregation of a plurality of part number segments each individually associated with one of said plurality of selectable characteristics of said configured communications cable, said plurality of part number segments being variable, such that at least one of said plurality of part number segments may be at least partially generated by the computer program if not already in existence;
a cable display code segment configured to:
retrieve at least one display element associated with said user selection of said at least one of said plurality of selectable characteristics of said cable component according to a pre-selected component of a solution stack configured to fetch said at least one display element,
display said at least one display element to said user as part of a seamlessly configured communications cable according to a cascading style sheet configured to align said at least one display element with said configured communications cable;
an alias part number code segment configured to:
receive an alias part number inputted by the user;
associate said alias part number with said configured communications cable, wherein said configured communications cable is already associated with another identifier; and
present said alias part number to a distributed networking system, such that said alias part number is searchable through a search engine.

2. A system for implementing a visual cable builder comprising:
a user interface for configuring a communications cable having at least one selectable characteristic, said user interface in operative communication with a client device,
said user interface configured to electronically send a user selection of said at least one selectable characteristic to a server,
said server configured to retrieve a display element in response to the user selection, and
said client device and said server cooperatively configured to display said display element concurrent to the user selection according to a pre-selected component of a solution stack disposed in connection with a cascading style sheet, said pre-selected component of a solution stack programming configured to fetch said display element, and said cascading style sheet configured to align said display element on said user interface as part of a configured communications cable;
said client device further configured to transmit an alias part number to said server, said server configured to associate said alias part number with said configured communications cable by linking a first data field associated with said configurable part number with a second data field associated with said alias part number, said server further configured to electronically transmit said alias part number to a distributed networking system, such that said alias part number is searchable through a third-party search engine;
said client device and said server further cooperatively configured to identify said at least one selectable characteristic of said configured communications cable and search at least one third-party server disposed in connection with said server for inventory data pertaining to said at least one selectable characteristic and display said inventory data to a user via said client device; and said client device and said server further cooperatively configured to retrieve a part number segment associated with said at least one selectable characteristic and display a configurable part number to the user, said configurable part number comprising a real-time aggregation of each said part number segment associated with each said at least one selectable characteristic.

3. The system as recited in claim 2 wherein said part number segment is variable, such that said part number segment may be at least partially generated by said server if said at least one selectable characteristic does not already have said part number segment assigned thereto.

4. A system for customization of communications cables, said system to be performed via a user interface disposed in input/output relation with a processor, said processor disposed in connection with a memory having computer readable instructions disposed thereon, said system comprising:

a user input code segment configured to receive a user selection of a selectable characteristic for each of a plurality of cable components;

a display code segment configured to display a display element for each said selectable characteristic for said plurality of cable components, said display code segment comprising a pre-selected component of a solution stack disposed in connection with a cascading style sheet, said pre-selected component of a solution stack configured to fetch the display element, and said cascading style sheet configured to seamlessly align the display element as part of a configured communications cable;

an inventory data code segment disposed in connection with at least one third-party server, said inventory data code segment configured to identify each said selectable characteristic, search said at least one third-party server for inventory data pertaining to each said selectable characteristic through data mining operations, and display said inventory data to a user;

a part number code segment comprising a rules engine, said part number code segment configured to retrieve a part number segment associated with each said selectable characteristic and at least one characteristic of said configured communications cable, and aggregate each said part number segment for creation of a configurable part number displayed to the user in real-time; and an alias part number code segment configured to associate an alias part number with said configured communications cable by linking a first data field associated with said configurable part number with a second data field associated with said alias part number.

5. The system of claim 4, wherein said inventory data code segment further comprises a closest match script configured to identify a closest match to said configured communications cable according to each said selectable characteristic.

6. The system of claim 4, wherein said part number code segment is further configured to automatically generate a new part number segment when said selectable characteristic has no said part number segment associated therewith.

7. The system of claim 6, wherein said inventory data code segment is further configured to associate said new part number segment with said inventory data from said at least one third-party server.

8. The system of claim 4, wherein said user input code segment is configured to receive an additional user selection for a new selectable characteristic for at least one of said plurality of cable components.

9. The system of claim 8, wherein said display code segment is configured to automatically update said configured communication cable in response to said additional user selection by fetching said display element associated with said new selectable characteristic and aligning said display element with said configured communications cable.

10. The system of claim 8, wherein said part number code segment is further configured to automatically update said configurable part number in response to said additional user selection by retrieving said part number segment associated with said new selectable characteristic and aggregating same into said configurable part number.

11. The system of claim 4, wherein said alias part number code segment is further configured to electronically transmit said alias part number on to a distributed networking system, such that said alias part number is searchable through a third-party search engine.

12. The system of claim 4, wherein each said part number segment is custom-made by the user and saved to an account attributed to the user.

13. The system of claim 4, wherein said at least one characteristic of said configured communications cable comprises the connector type, polish, cable jacket diameter, type, and color of said configured communications cable.

* * * * *